United States Patent [19]
Emmons

[11] Patent Number: 5,882,064
[45] Date of Patent: Mar. 16, 1999

[54] MODULAR VEHICLE FRAME

[75] Inventor: J. Bruce Emmons, Beverly Hills, Mich.

[73] Assignee: Autokinetics, Inc., Rochester Hills, Mich.

[21] Appl. No.: 837,669

[22] Filed: Apr. 22, 1997

Related U.S. Application Data

[60] Provisional application No. 60/016,500, Apr. 30, 1996.

[51] Int. Cl.⁶ .................................................. B60R 27/00
[52] U.S. Cl. .......................... 296/197; 296/194; 296/195; 296/196; 296/203.01
[58] Field of Search ................................. 296/197, 194, 296/195, 196, 203

[56] References Cited

U.S. PATENT DOCUMENTS

| | | |
|---|---|---|
| 2,627,426 | 2/1953 | Toncray et al. . |
| 4,355,844 | 10/1982 | Muzzarelli . |
| 4,440,435 | 4/1984 | Norlin . |
| 4,660,345 | 4/1987 | Browning . |
| 4,869,539 | 9/1989 | Cassese . |
| 4,950,026 | 8/1990 | Emmons . |
| 5,011,201 | 4/1991 | Takahashi et al. . |
| 5,201,566 | 4/1993 | Mori . |
| 5,352,011 | 10/1994 | Kihara et al. . |
| 5,374,081 | 12/1994 | Schoderer et al. . |

FOREIGN PATENT DOCUMENTS

| | | |
|---|---|---|
| 0291385A1 | 5/1988 | European Pat. Off. . |
| 6490881 | 7/1989 | Japan . |
| 2131361 | 6/1984 | United Kingdom . |

OTHER PUBLICATIONS

PCT International Search Report—Form PCT/ISA/210—Relating to International Application No. PCT/US97/06929—filed Apr. 22, 1997.

*Primary Examiner*—Gary C. Hoge
*Attorney, Agent, or Firm*—Howard & Howard

[57] ABSTRACT

A spaceframe for a vehicle body includes distinct passenger compartment, front and rear suspension modules. Each module is completely assembled individually and later connected to the other modules to complete the frame, which renders the assembly process much more efficient. The passenger compartment module essentially consists of two longitudinal side rails. The front and rear suspension modules combine with the side rails to form generally rectangular compartments at the front and rear of the frame. The generally rectangular compartments provide the primary lateral and torsional stability to the entire frame. Energy absorbing modules preferably are provided at the front and rear ends of the frame.

26 Claims, 5 Drawing Sheets

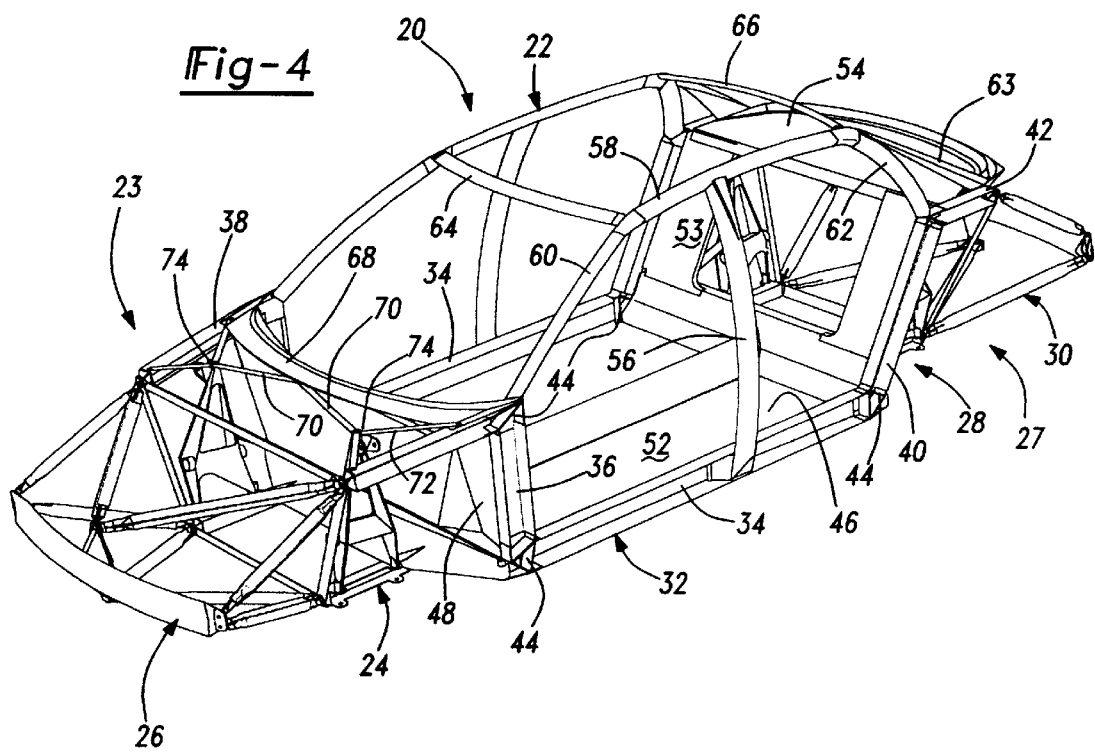

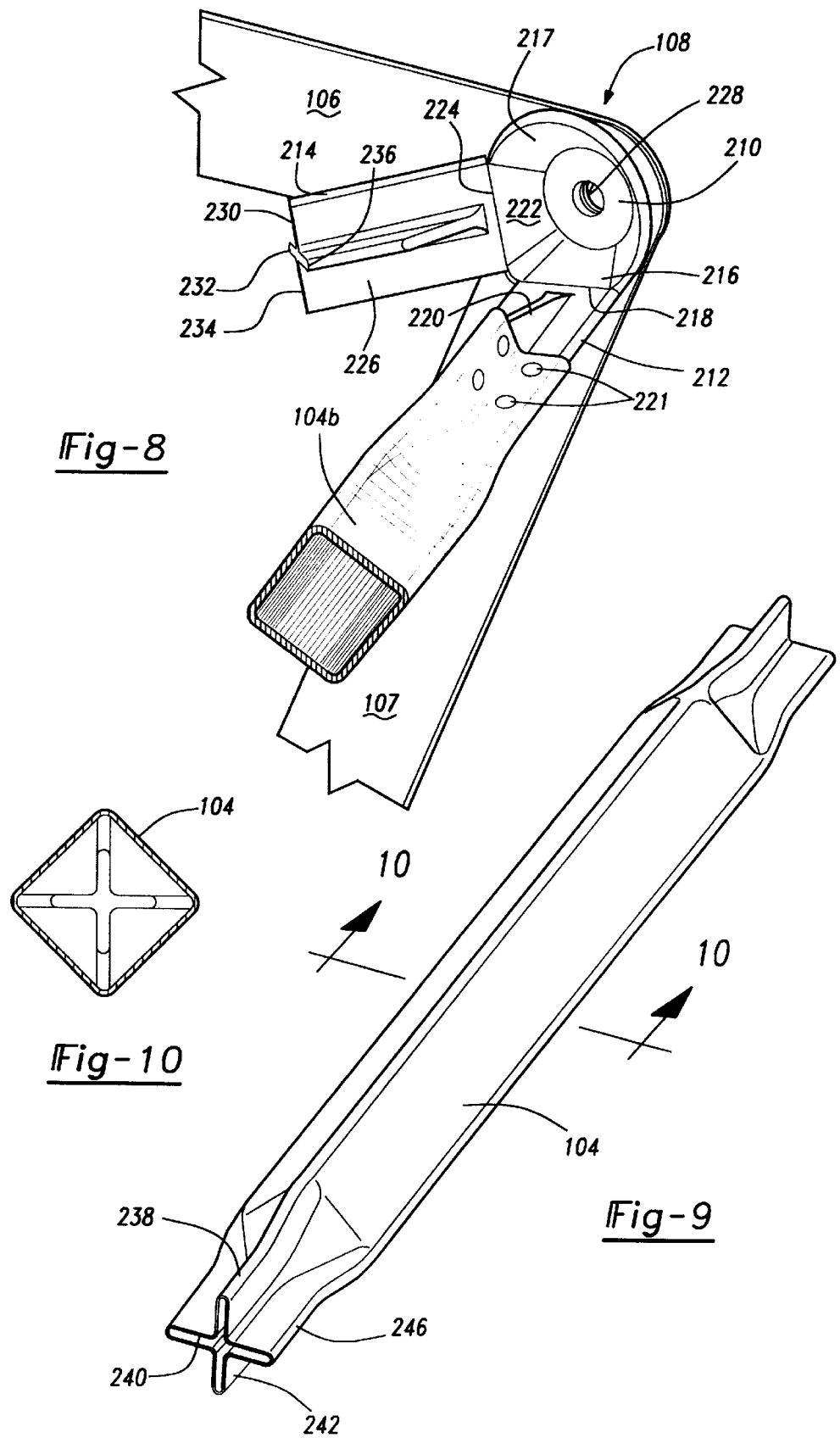

MODULAR VEHICLE FRAME

This application claims benefit of Provisional Appln. 60/016,500 filed Apr. 30, 1996.

BACKGROUND OF THE INVENTION

This invention relates to passenger vehicle body frames and, more particularly, to a vehicle frame including several distinct modules or subassemblies.

Passenger vehicle body frames typically include a ladder-type construction or a unibody structure. These structures have been used for many years and are well known in the art. Although conventional structures have proven useful, it is desirable to improve upon existing vehicle constructions.

For example, the automotive industry is constantly trying to reduce the weight of vehicles to improve fuel economy without reducing or sacrificing structural integrity. Further, it is desirable to provide vehicles that are more able to withstand impact collisions and provide more safety to passengers. Various attempts have been made to achieve improvements such as substituting different materials for part of or all of the vehicle frame. Although materials such as aluminum or composites have lightweight advantages, structural stiffness is typically sacrificed. Moreover, many substitute materials prove prohibitively expensive and, therefore, are not feasible.

Another disadvantage associated with conventional vehicle frames is that certain difficulties and complexities are presented during the assembly process. For example, vehicle frames include forwardly extending midrails that protrude through the area that serves as the engine compartment. Assembly of the drivetrain and the front suspension system for the vehicle is more difficult because of the presence of the midrails. It would be advantageous, for example, to be able to completely assemble the suspension system before mounting it on the vehicle. Conventional frames, however, make such pre-assembly impractical or impossible.

This invention provides a vehicle body frame that represents a dramatic improvement over the art. The ease of vehicle manufacture is greatly enhanced. The structural stiffness and durability of the frame is increased. Passenger safety also is enhanced because of the design of a body frame according to this invention.

SUMMARY OF THE INVENTION

In general terms, this invention is a vehicle body frame made up of several subassemblies or modules. A passenger compartment module includes a pair of side rails that extend along the lower and outer edges of the passenger compartment. A front suspension module is attached to each of the side rails of the passenger compartment module. The front suspension module extends between the two side rails at the front end of the passenger compartment. The front suspension module, as the name suggests, is adapted to support a completed front suspension assembly. The front suspension module also supports the drive train of the vehicle. A rear suspension module is attached to the passenger compartment module at a second end of the side rails, which is opposite the front suspension module. The rear suspension module also extends between the two side rails. The attachment of the front suspension module and the rear suspension module to the passenger compartment module side rails provides the primary lateral structural stability and rigidity for the entire vehicle frame. Since the front and rear suspension modules provide lateral stability to the vehicle frame when properly connected to the passenger compartment side rails, no other lateral reinforcement pieces are required.

A front energy absorbing module preferably is connected to the front suspension module and the most forward end of the passenger compartment side rails. The front energy absorbing module preferably includes eight energy absorbing tubes that are aligned to crush in a predicted pattern upon an impact or collision. The alignment and connection of the energy absorbing tubes ensures that the majority of the energy in an impact is absorbed by the frontmost module of the frame, which greatly enhances passenger safety. A rear energy absorbing module is, similarly, connected to the rear of the vehicle frame.

The various other features and advantages of this invention will become apparent to those skilled in the art from the following detailed description of the presently preferred embodiment. The drawings that accompany the detailed description can be described as follows.

BRIEF DESCRIPTION OF THE DRAWINGS

FIG. 4 is a perspective, diagrammatic illustration of a vehicle body frame designed according to this invention.

FIG. 5 is an exploded view of the front end of the embodiment of FIG. 4 showing how the front end of the frame comprises several modules.

FIG. 8 is a diagrammatic illustration of a preferred mounting joint used with the body frame of FIG. 5.

FIG. 9 is a diagrammatic illustration of a preferred embodiment of an energy absorbing tube used as part of this invention.

FIG. 10 is a cross-sectional view taken along the lines 10—10 in FIG. 9.

DETAILED DESCRIPTION OF THE PREFERRED EMBODIMENT

Figure 1:
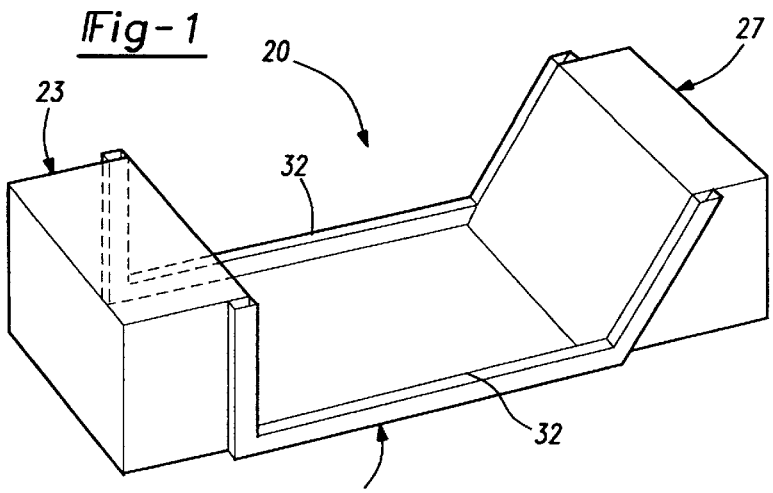
FIG. 1 is a schematic illustration of a simplified vehicle body frame that illustrates the structural principles of this invention.

FIG. 1 schematically illustrates the structural arrangement of a vehicle body frame 20. A passenger compartment 22 includes a pair of side rails 32 that extend between a generally rectangular front portion 23 and a generally rectangular rear portion 27. The front and rear portions are rigid and resist flexing or twisting. Accordingly, the connection between the side rails 32 and the front portion 23 and the rear portion 27 provides a very rigid and stable vehicle frame 20. The generally rectangular portions 23 and 27 are the primary frame lateral reinforcement between the side rails 32 and provide torsional stiffness to the frame 20.

Figure 2:
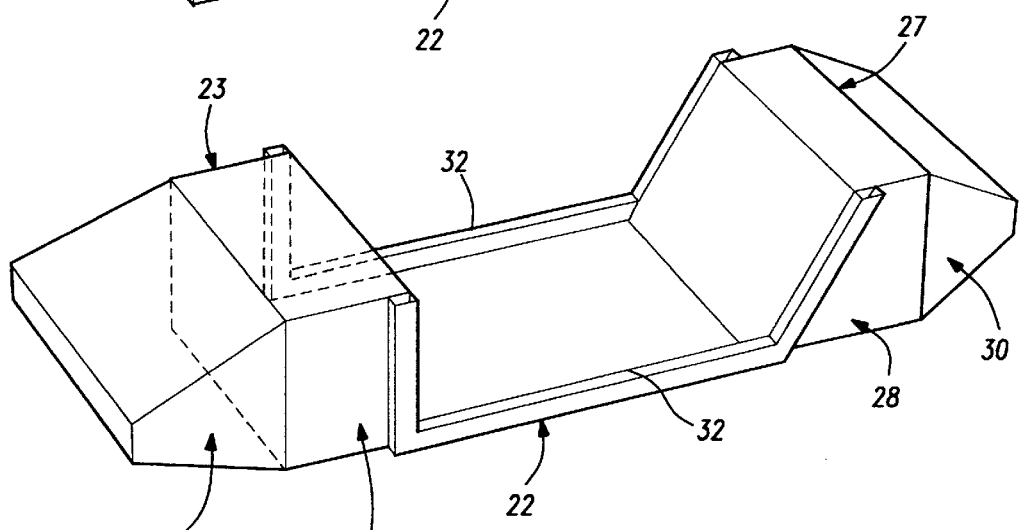
FIG. 2 is a schematic illustration of the embodiment of FIG. 1 with additional energy absorbing modules.

FIG. 2 schematically illustrates the addition of a front energy absorbing module 26 to the front portion 23. The front energy absorbing module 26 is designed to absorb impact or collision energy in a manner to be described below. Similarly, a rear energy absorbing module 30 is added to the rear portion 28. The front energy absorbing module 26 contributes to the torsional stiffness of the frame 20. The rear energy absorbing module 30 does not contribute to the torsional stiffness because the top of that module must be open for trunk access.

Figure 3:
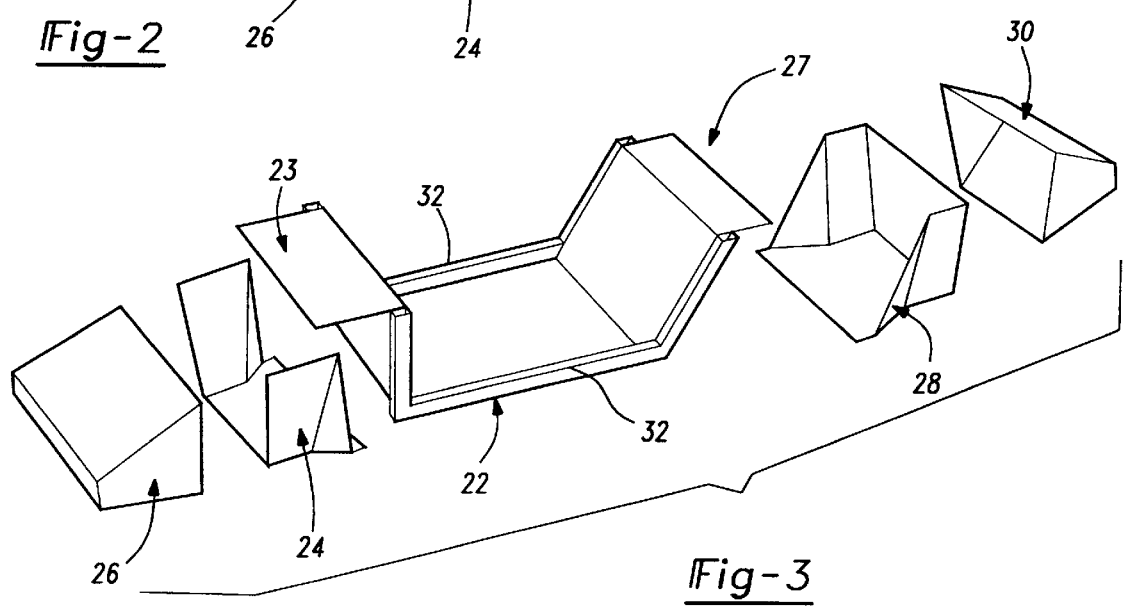
FIG. 3 is a schematic, exploded illustration of the embodiment of FIG. 2 modified to provide front and rear wheel clearances.

FIG. 3 schematically illustrates a modification to the embodiment of FIG. 2. The front portion 23 and the rear portion 27 are modified to allow for clearance for the wheels of the vehicle. The portions 23 and 27, however, are still rigid and resist twisting or flexing. FIG. 3 also schematically illustrates how the modified front and rear portions are divided into subassemblies. The front portion 23 is divided into a front suspension module 24 and a front energy absorbing module 26. The rear portion 27 is divided into a rear suspension module 28 and a rear energy absorbing module 30.

Building a vehicle frame out of the modules as diagrammatically illustrated, provides the ability to produce the vehicle frame from a plurality of subassemblies or modules. For example, the passenger compartment 22 preferably is assembled as a complete module. Similarly, the front suspension module 24 and the components of the vehicle front suspension preferably are pre-assembled as a complete module and then attached to the front of the passenger compartment module 22. The front energy absorbing module 26, which has been pre-assembled, is then attached to the front of the passenger compartment 22 and the front suspension module 24. Likewise, the rear frame portion preferably is assembled by completing the rear suspension module 28 and the suspension components before connecting them to the passenger compartment module 22. The rear energy absorbing module 30 then is attached to the rear suspension module 28 and the passenger compartment 22.

The above description and FIGS. 1 through 3 schematically illustrate the principles of design of a vehicle body designed according to this invention. The combination of distinct modules greatly facilitates and enhances the vehicle frame manufacturing process and enhances vehicle structural efficiency and passenger safety.

FIG. 4 diagrammatically illustrates a modular vehicle body frame 20 designed according to the above principles. A passenger compartment module 22 is attached to a front suspension module 24 at one end. A front energy absorbing module 26 is attached to the passenger compartment module 22 and the front suspension module 24, respectively. A rear suspension module 28 is connected to a second end of the passenger compartment module 22. A rear energy absorbing module 30 is connected to the rear suspension module 28 and the passenger compartment module 22, respectively. Details about the connections between the various modules will be provided below.

The passenger compartment module 22 includes a pair of side rails 32. The side rails 32 preferably are made up of several pieces. Rocker channels or primary rail portions 34 preferably are constructed or formed of fabricated open channel sections having a generally U-shaped cross-section. A front hinge pillar 36 is connected to one end of the rocker channel 34. A front rail extension or first end rail portion 38 is connected to the other end of the front hinge pillar 36. The other end of the rocker 34 is connected to a rear latch pillar 40 that is also connected to a rear rail extension or second end rail portion 42. The primary rail portions 34 preferably are generally parallel to the end rail portions 38 and 42. The alignment can be varied within a range from zero to twenty degrees, depending on a particular application.

The various portions of the side rail 32 preferably are interconnected with cast nodes 44. The cast nodes 44 are described in more detail below.

The passenger compartment 22 has a lower panel 46 extending between the two side rails 32. As can be seen in the drawing, the lower panel 46 includes a dash portion or fire wall 48, a floor panel 52, a seat back portion 53 and a package shelf 54. The lower panel 46 extends between the two side rails 32. The structural stability of the frame 20 is provided through a combination of the front suspension module 24, the rear suspension module 28 and the lower panel 46. The lower panel 46 adds shear stiffness to the frame 20, while the front and rear suspension modules provide compressive strength and stiffness in the lateral direction.

The passenger compartment module 22 also includes a B pillar 56 extending between the rocker 34 and a roof rail 58. One end of the roof rail is joined to the side rail 32 through an A pillar 60. The other end of the roof rail is connected through a C pillar 62 to the rear portion of the side rail 32. Angled rear window pillars 63 extend between respective C pillars 62 and the rear rail extension 42. Extending between the connections between the roof rail, the A pillar and the C pillar are a windshield header 64 and a backlight header 66, respectively.

The upper rail members 38 have a cowl beam 68 extending between them near the connection between the upper rails 38 and the front hinge pillars 36. A pair of diagonal struts 70 extend on forward diagonals away from the center portion of the cowl beam 68. A pair of diagonal struts 72 extend from the upper rails 38 to the diagonal struts 70. A third set of diagonal struts 73 extend between a front end of the upper rails 38 and the end of diagonal struts 70. All three diagonal struts on each side intersect at a connection point 74.

The entire passenger compartment module 22 preferably is assembled as a complete subassembly before the remainder of the vehicle frame is connected to the passenger compartment module.

The component pieces of the passenger compartment module 22 preferably are made from stainless steel. Stainless steel is the preferred material because of its combined features of being high in strength per unit weight, high in ductility or toughness, and moderate in cost. Other materials such as carbon steel, aluminum or composites could be used in forming a vehicle frame designed according to this invention. In one example, the channel sections, such as rockers 38, the formed panels such as the lower panel 46, and the tubular members such as the roof rail 58 are made from an austenitic stainless steel known as Armco Nitronic 30, preferably cold rolled to 120,000 psi yield strength. The structural members such as side rails 32 preferably have a wall thickness in the range between 1 mm and 2 mm. Relatively large, flat panels and the floor panel 52 preferably have a ½ to 1 mm thickness.

The front suspension module 24, as the name suggests, carries the front suspension of the vehicle. A significant advantage of this invention is that an entire front suspension assembly can be assembled onto a completed front suspension module before it is attached to the remainder of the vehicle. This advantage greatly simplifies the manufacturing process and results in economical advantages in reduced operator time and tooling costs. Importantly, the completed front suspension module 24 and the completed front suspension system (not shown) is moved into place and connected to the passenger compartment module from beneath the upper rail members 38. In the prior art, it is not possible to preassemble a complete front suspension system because typical vehicle frames include forwardly extending midrails that do not allow such an assembly procedure. Eliminating a requirement for conventional midrails from the vehicle body is another significant advantage provided by this invention.

The front suspension module 24 includes two suspension towers 80 (best shown in FIG. 5) and a cross car beam 82. A lateral strut 84 is provided for further structural stiffness and to position the front lower ends of the suspension towers 80. A horizontal plate preferably extends between the cross car beam 82 and the lateral strut 84. Alternatively, one or more diagonal braces could be used. A set of diagonal struts 85 extend between the midpoints of the suspension towers 80 and the lateral ends of the cross car beam 82. The suspension towers 80 include a spring mount portion 86, which is designed to accommodate conventional suspension springs and components. The spring mount portion 86 is adjacent a connector 87 that is to be connected to the connection point 74. A bolt preferably extends through the connector 87, the diagonal struts 70, 72, and 73 to complete the connection at that point. The suspension towers are connected to the cross car beam 82 at the mounting members 88. The suspension towers 80 preferably include suspension tower triangular sections 80A and 80B. These triangular sections provide load distribution paths that enhance structural stiffness and strength.

Figure 6:
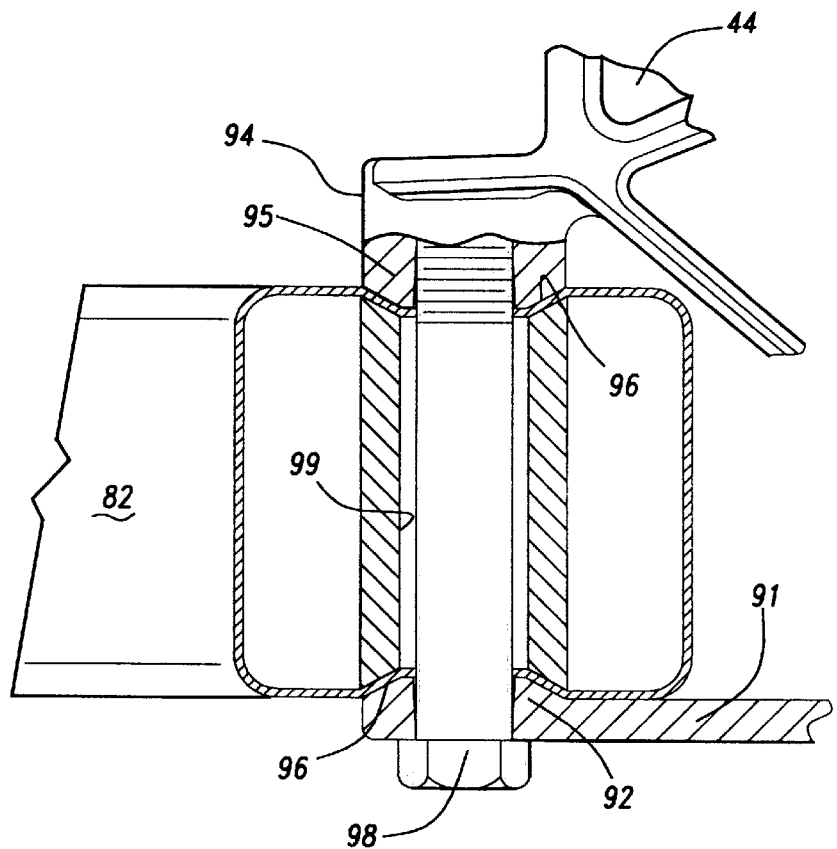
FIG. 6 is a partial cross sectional view of a connection between portions of the frame shown in FIGS. 4 and 5.

The front suspension module 24 can also be referred to as a subframe portion. The subframe portion 24, which provides support for the vehicle engine and drivetrain, is connected to the passenger compartment module at the connection points 90 to the nodes 44. This connection is illustrated in partial cross section in FIGS. 6. Each of the front and lower nodes 44 includes an extension mounting arm 91. The mounting arm 91 includes a raised conical protrusion 92. An internally threaded mounting boss 94 is formed integrally with the cast node 44. The lower portion (according to the drawing) of the threaded mounting boss 94 has a raised conical protrusion 95. The cross car beam 82 preferably includes a dimple 96 that matingly or nestingly receives the raised conical protrusion 92 and 95, respectively. A bolt 98 is threaded into the interior of the mounting boss 94. A metal bushing 99 is provided through the opening in the cross car beam 82. The bolt 98 most preferably is not threadingly engaged to the opening through the bushing 99 or the cross car beam 82.

The combination of the raised conical protrusion 92 and 95 and the dimple 96 on the cross car beam 82 provide a high strength connection between the cast node 44 (and, therefore, the passenger compartment 22) and the front suspension module 24.

Referring back to FIG. 5, the front energy absorbing module 26 includes a bumper back-up beam 102 and two sets of four energy absorbing tubes 104A, 104B, 104C and 104D. The energy absorbing tubes 104 preferably have a square cross section. One cross strut 106 is provided generally parallel to the bumper back-up beam 102. An upright strut 107 extends between an upper and lower mounting joint 108. The mounting joints 108 are provided for connecting the energy absorbing tubes to the front suspension and passenger compartment modules, respectively. A bolted connection is made at the points labeled 109. The opposite ends of the energy absorbing tubes 104 are connected to the bumper back up bean 102 through mounting joints 108 at connection points 109A and 109B.

Figure 7:
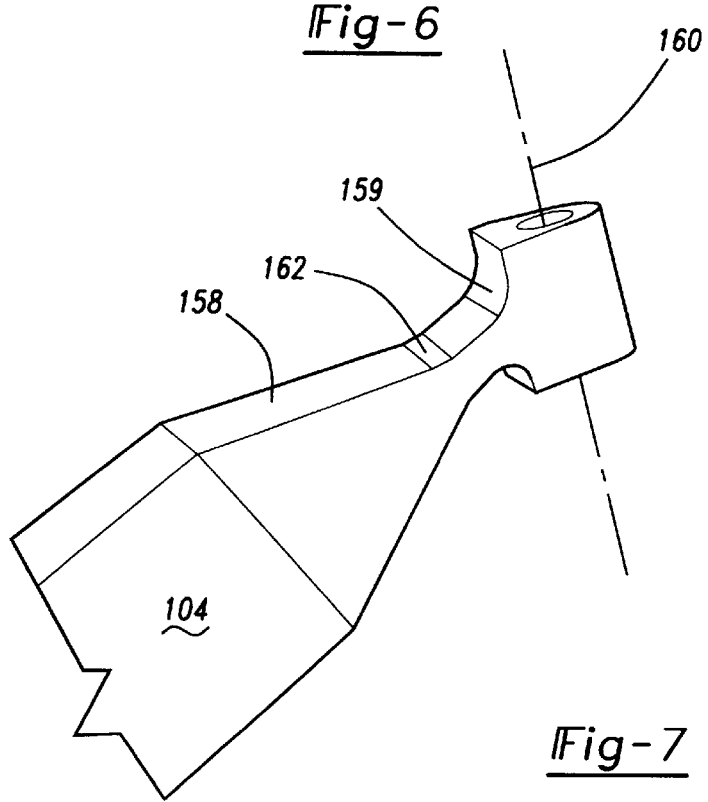
FIG. 7 is a diagrammatic illustration of a mounting joint for use with a vehicle frame designed according to this invention.

The mounting joints 108 ideally are dual pivot, universal joints or a pivot and flexure joint. The joint members 108 preferably are made from stainless steel. An example of a pivot and flexure joint is illustrated in FIG. 7 having two arm portions 158 and 159. One of the arms is coupled to a crash tube 104. The other arm includes a pivot axis 160 that allows movement in one direction. A flex joint or flexure portion 162, which is at the intersection of the arm portions 158 and 159, permits movement in a direction generally perpendicular to the pivot direction. Accordingly, the connection between the energy absorbing tubes 104 and the front suspension and passenger compartment modules provides for movement in two directions.

As a simplification of the above embodiments, a single axis may be defined that would allow flexure during a frontal crash. Moderate deviations from a direct frontal crash typically can be accommodated by the ductility of the metal so that a two-directional movement at the mounting joint is not always necessary.

The presently preferred embodiment includes a mounting joint 108 as illustrated in FIG. 8. The mounting joint 108 includes a generally flat plate portion 210 and two tube mounts 212 and 214. The tube mount 212 includes an arm portion 216 that is coincident with a flare portion 217 and extends between the plate portion 210 and a flexure portion 218. A tube receiving arm 220 extends from the flexure portion 218 in a direction opposite from the arm portion 216. The energy absorbing tubes preferably are attached to the tube receiving arms by a plurality of spot welds 221. The flexure portion 218 provides for a deformation of the tube mount 212 in the event of an impact force on the bumper back-up beam 102, for example. Depending on the direction of the impact force, the impact absorbing tube 104B can pivot relative to the plate portion 210 as the flexure portion 218 responsively deforms so that the arm 220 pivots relative to the remainder of the mounting joint 108. Similarly, the tube mount 214 includes a first arm portion 222, a flexure portion 224 and a tube receiving arm portion 226.

The plate portion 210 preferably is bolted to an appropriate connection point 109 on the vehicle frame. Specifically, the plate portions of the upper mounting joints preferably are bolted to the connection points 109 on the upper rail members 38 and the plate portions of the lower mounting joints preferably are bolted to the connection points 109 at a lower front end of the suspension module 24. The bolted connection is made through an opening 228 and preferably is set so that the plate portion 210 remains fixed relative to the connection point 109.

The connection points 109A (see FIG. 5) preferably include mounting joints 108 as illustrated in FIG. 8 because the ends of two tubes 104 are placed in close proximity to each other. At the mounting points 109B (FIG. 5), the joints 108 are slightly modified. As can be seen in the figure, the forward ends of the two tubes 104B and 104D are spaced apart. Therefore, the plate portion 210 and the flare portion 217 are elongated so that the tube receiving arms are spaced accordingly. Otherwise the mounting joints are the same as already described.

As best seen on the tube receiving arm portion 226 the mounting joint tube receiving arms include four perpendicularly oriented fin portions 230, 232, 234 and 236. FIG. 9 illustrates a preferred embodiment of the energy absorbing tubes 104. Each end of the tubes 104 includes four generally perpendicularly oriented channels 238, 240, 242 and 246. The fin portions on the mounting joint 108 are received within the channels on the tubes 104 as illustrated in FIG. 8, for example.

The energy absorbing tubes 104 as illustrated in FIG. 9 are configured for use with mounting joints as illustrated in FIGS. 5 and 8 while still maintaining the desirable energy absorbing characteristics described below. The generally square cross section illustrated in FIG. 10 is maintained along a substantial portion of the length of the energy absorbing tubes 104.

It is most advantageous to mount the energy absorbing tubes 104 in an arrangement generally as illustrated such that an impact force to the front of the vehicle is transmitted axially along the crash tubes 104. A direct or true axial load causes the square cross-sectioned tubes 104 to deform in a predictable fashion. Specifically, the tubes will fold upon themselves in a stacking pattern so long as the load remains as close to truly axial as practical. As can be appreciated from the drawings, as the bumper back-up beam 102 moves toward the passenger compartment 22, the energy absorbing tubes 104 should move generally inward. That is, the top energy absorbing tubes 104A and 104B ideally will move inward and downward according to the drawing, while the energy absorbing tubes 104D and 104C will move inward and upward according to the drawing.

The mounting joints 108 permit pivoting or flexing as described above to allow the energy absorbing tubes 104 to move in a manner that resembles the ideal pattern just described. The energy absorbing tubes 104 can pivot because of the flexure portions 218 and 224. Such pivotal movement permits the tubes 104 to move in a pattern that resembles the ideal pattern. Therefore, the mounting joints 108 facilitate maintaining an axial load on the tubes 104.

Providing a predictable deformation pattern of the energy absorbing tubes 104 significantly absorbs the energy from an impact or collision. Otherwise, unpredictable deformations may result in leftover energy which must be absorbed by the passenger compartment, which is not always desirable. An energy absorbing module 26 designed and mounted according to this invention provides significant structural and passenger safety advantages.

Figure 11:
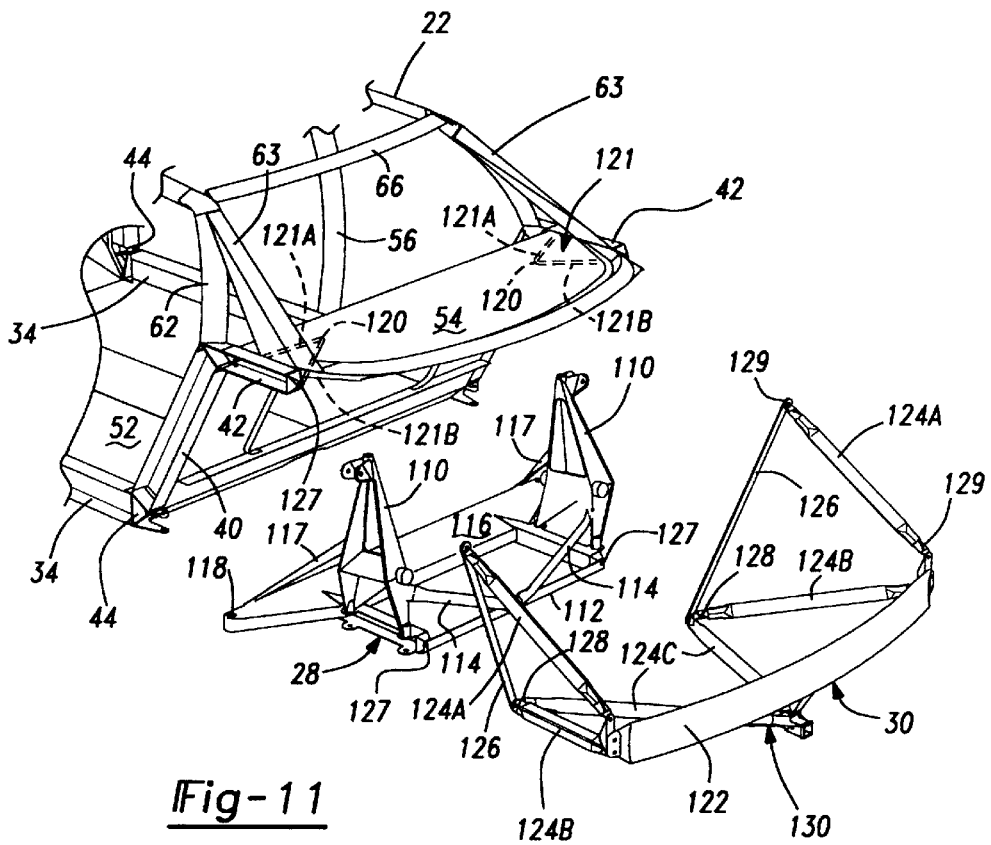
FIG. 11 is a diagrammatic, exploded view of a rear portion of the embodiment of FIG. 5 showing how it includes several modules.

As best shown in FIG. 11, the rear suspension module 28 includes two suspension towers 110. A lateral strut 112 extends between the lower rear ends of the suspension towers. A pair of diagonal struts 114 are connected to the tower 110 and the lateral strut 114. A cross car beam 116 is included that is essentially the same as cross car beam 82. A horizontal plate preferably extends between the cross car beam 116 and the lateral strut 114. Two diagonal struts 117 extend between the front lateral edge of the cross car beam 116 and a midpoint on the front of the suspension towers 110.

The suspension towers 110, like their counterparts the suspension towers 80 of the front suspension module 24, are adapted to support a completed rear suspension assembly. Most preferably, the entire suspension assembly is assembled with a completed rear suspension module 28 and then that entire unit is mounted onto the rear of the passenger compartment module 22. The mounting point 118, which is for connection to nodes 44, is the same as that described with respect to the front suspension module and, therefore, need not be further described here. The mounting points 120 are similar to those at the connection points 74 for the front suspension module. A triangular arrangement 121 of the end rail portions 42 and struts 121A and 121B is provided at each side of the frame near the rear end of the passenger compartment. The triangular struts provide structure for the suspension towers 110 to be supported on the second end rail portions 42.

The rear energy absorbing module 30 includes a bumper back-up beam 122 and two sets of energy absorbing tubes 124A, 124B and 124C. A strut 126 is provided at each lateral end of the module 30. The connection points 128 and 130 preferably include mounting joints as diagrammatically illustrated in FIG. 8 and described above with respect to the front energy absorbing module 26. The mounting joints at 129 are different because there is no requirement for two tubes to end adjacent each other. The mounting joint includes only one tube receiving arm portion. Otherwise, the configuration and function of the mounting joint at 129 is the same as described above. The connection of the rear energy absorbing module 30 to the passenger compartment module 22 and the rear suspension module 28 is accomplished at the points 127 and is similar to that of the front energy absorbing module and, therefore, need not be further described.

Figure 12:
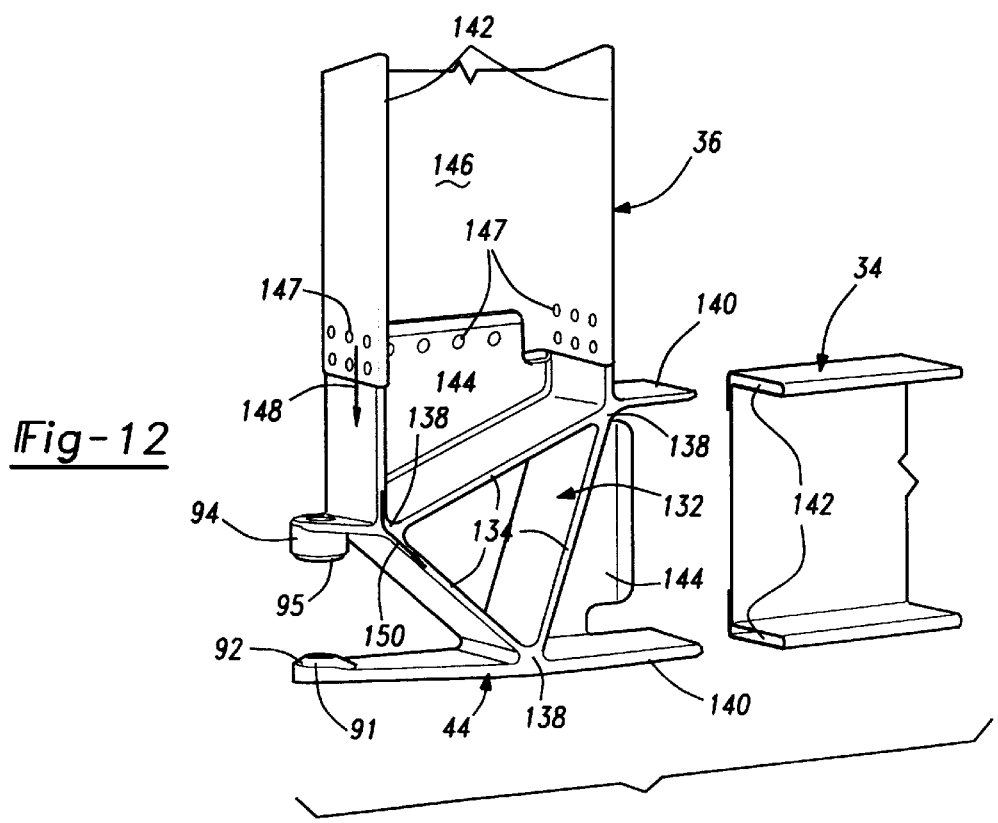
FIG. 12 is a diagrammatic illustration of a preferred connection between portions of a frame designed according to this invention.

Referring now to FIG. 12, at least the lower four cast nodes 44 include a triangular arrangement 132 of load paths 134. The load paths 134 essentially are legs of the triangle 132. Importantly, the load paths, or legs 134, intersect at nodes 138.

The cast nodes 44 preferably are integrally formed from a casting process. The known Hitchner or FM processes can be used, for example. The preferred material for the cast nodes 44 is a stainless steel alloy. A variety of materials are available, however, in one example, the preferred material is Armco Nitronic 19D, which is a duplex stainless steel. The thickness of the casting preferably is approximately 3–4 mm.

The cast nodes 44 are connected to the channel section beam members such as the rockers 34 and the front hinge pillars 36. Protruding away from the triangular arrangement 132 in perpendicular directions are insert tabs 140. The insert tabs 140 are received within roll formed channel sections on the arms 142 of the channel members. A flange 144 overlaps a web portion 146 of the channel members. The insert tabs 140 are welded to the roll formed channel sections on the arms 142 by a conventional spot welding or laser welding technique. Spot welds are shown at 147. Similarly, the flange 144 is welded to the web portion 146.

Although the spacing within the triangle 132 is open after the casting process, it preferably is capped, plugged or filled when the node 44 is incorporated into a complete frame 20. Those skilled in the art will be able to choose an appropriate cap or filler so that there is no leak through the node piece 44.

As can be seen, the load paths 134 provide a path for changing the direction of forces or loads imposed on the channel members of the side rails. For example, a load in the direction of force arrow 148 along the arm portion 142 is redirected along one of the load paths 134 as shown by the arrow 150. Accordingly, shear stresses and impact forces or loads that otherwise would cause fractures or severe deformation in the vehicle frame are dissipated and effectively reduced by the redirection of the load along one of the load paths 134. Accordingly, cast nodes 44 designed according to this invention provide structural integrity along with enhanced structural stability in the event of a collision or impact.

The foregoing description is exemplary rather than limiting in nature. Variations and modifications of the preferred embodiment will become apparent to those skilled in the art that do not depart from the purview and spirit of this invention. Accordingly, the appended claims must be studied to determine the legal scope of protection accorded this invention.

What is claimed is:

1. A vehicle body frame, comprising:
    a passenger compartment module having two side rails extending along outer edges of said passenger compartment, each said side rail including a primary rail portion extending between first and second connector rail portions, said first and second connector rail portions being connected to first and second end rail portions, respectively, said first and second end rail portions being generally parallel to said primary rail portions;
    a first suspension module attached to said side rails at a first end of said primary rail portions and attached to said first end rail portions, said first suspension module being adapted to support a first vehicle suspension assembly; and
    a second suspension module attached to said side rails at a second end of said midrail portions and attached to said second end rail portions, said second suspension assembly being adapted to support a second vehicle suspension assembly; and
    wherein the arrangement of said first and second suspension modules extending between said side rails provides torsional stiffness to said vehicle frame.

2. The vehicle body frame of claim 1, further comprising a first energy absorbing module supported by said first suspension module and said first end rail portions, said first energy absorbing module extending from said first suspension module in a direction away from said passenger compartment module.

3. The vehicle body frame of claim 2, further comprising a second energy absorbing module supported by said second suspension module and said second end rail portions, said second energy absorbing module extending from said second suspension module in a direction opposite said first energy absorbing module.

4. The vehicle body frame of claim 1, wherein said passenger compartment module further includes a cowl beam extending laterally between and connected to said first end rail portions and a generally planar panel extending laterally between said primary rail portions.

5. The vehicle body frame of claim 4, wherein said passenger compartment module further includes two roof rails each supported by one of said side rails and a first and second header rail extending laterally between said roof rails.

6. The vehicle body frame of claim 1, wherein said first suspension module includes two suspension towers each having a first end for supporting one end of the first vehicle suspension assembly, and a cross beam extending laterally between said towers near a second end of said towers, said cross beam being supported by said siderails near said first end of said primary rail portions.

7. The vehicle body frame of claim 6, wherein said passenger compartment module further includes a cowl beam extending laterally between and connected to said first end rail portions and a diagonal strut member extending between each said first end rail portion and said cowl beam and wherein each said first tower end is connected to one of said diagonal strut members.

8. The vehicle body frame of claim 1, wherein said second suspension module includes two suspension towers each having a first end for supporting one end of the second vehicle suspension assembly and a cross beam member extending laterally between said towers near a second end of said towers, said cross beam member being supported by said siderails near said second end of said primary rail portions and said suspension tower first ends being supported by said second end rail portions.

9. The vehicle body frame of claim 8, further comprising at least two diagonal strut members on each side of said frame, each said diagonal strut member having a first end supported on a respective one of said side rails and a second end positioned to support said suspension tower first ends.

10. The vehicle body frame of claim 8, further comprising two generally triangular arrangements of three diagonal strut members, at least one strut member within each said arrangement having one end supported on a respective said primary rail portion, at least one strut member within each said arrangement having one end supported on a respective said end rail portion, the other ends of said diagonal strut members being spaced inwardly toward a middle portion of the frame and positioned adjacent each other, and wherein said suspension tower first ends are supported on said other ends of said strut members, respectively.

11. The vehicle body frame of claim 2, wherein said first energy absorbing module includes a transverse beam member extending between and supported by a plurality of tube members that extend between said transverse beam and said first suspension module, said tube members being supported by said first end rail portions and said first suspension module such that a force incident on said transverse beam member is absorbed axially by said tube members.

12. The vehicle body frame of claim 11, wherein said tube members are supported by said first end rail portions and said first suspension module for pivotal movement upon a force being absorbed axially by said tube members such that said tube members pivot relative to a remainder of said frame as an axial force is absorbed.

13. The vehicle body frame of claim 12, wherein said tube members are supported for pivotal movement in two directions.

14. The vehicle body frame of claim 11, wherein said tube members are mounted to said first end rail portions and said first suspension module by mounting joints that each include two arm portions extending away from a central flexure portion having a nominal cross section, said arm portions having a cross section that generally increases along a length of said arms in a direction away from said flexure portion and wherein one of said arms of each said mounting joint is connected to one of said tube members.

15. The vehicle body frame of claim 1, wherein said side rails include generally triangular joint members between said primary rail portions and said first and second connector rail portions, respectively and between said first and second connector rail portions and said first and second end rail portions, respectively.

16. A vehicle body frame, comprising:
    a substantially torsionally flexible passenger compartment module having first and second ends;
    a first lateral support module coupled to said passenger compartment module first end;
    a second lateral support module coupled to said passenger compartment module second end;
    wherein said passenger compartment module first end and said first lateral support module combine to define a generally rectangular engine and suspension compartment and said passenger compartment module second end and said second lateral support module combine to define a generally rectangular luggage and suspension compartment and wherein said generally rectangular compartments provide the primary torsional stiffness to the entire said frame.

17. The vehicle body frame of claim 16, wherein said passenger compartment module includes two spaced siderails each having a first end rail portion connected with a first upright beam portion, said first end rail portions and first upright beam portions defining said first end of said passenger compartment module, each side rail further including a primary rail portion connected with said first upright beam portions at one end, the other end of said primary rail portions being connected with a second upright beam portion that is connected with a second end rail portion, said second upright beam portions and second end rail portions defining said second end of said passenger compartment module.

18. The vehicle body frame of claim 16, wherein said first and second end rail portions and said primary rail portions all have longitudinal axes that are generally parallel to each other.

19. The vehicle body frame of claim 18, wherein said generally parallel axes are angled relative to each other within a range from zero to about twenty degrees.

20. The vehicle body frame of claim 16, wherein said connections comprise generally triangular node members and wherein two apexes on each triangle of said node members are connected to an end on one of said rail or beam portions, respectively.

21. The vehicle body frame of claim 16, further comprising two energy absorbing modules supported by said generally rectangular compartments, respectively, for dissipating at least a portion of energy from a force incident on said energy absorbing modules.

22. The vehicle body frame of claim 16, wherein said first and second lateral support modules each include two suspension towers that each are connected to a cross car beam member, two of said suspension towers being supported at one tower end by said passenger compartment module first end, two of said suspension towers being supported at one tower end by said passenger compartment module second end, said cross car beam members extending laterally across said frame and being supported by said passenger compartment module ends, respectively.

23. A method of assembling a vehicle body frame comprising the steps of:
   (a) assembling a first suspension supporting module;
   (b) assembling a second suspension supporting module;
   (c) attaching the first suspension module to first ends of two longitudinal side rails; and
   (d) attaching the second suspension module to second ends of the two side rails to thereby complete a passenger compartment module between the first and second suspension modules and wherein the suspension modules provide the primary torsional stiffness to the frame.

24. The method of claim 23, wherein steps (a) and (b) are performed by attaching a completed suspension assembly to each module before performing steps (c) and (d).

25. The method of claim 23, further comprising attaching an energy absorbing module to the first suspension module and the passenger compartment module.

26. The method of claim 23, further comprising attaching an energy absorbing module to the second suspension module and the passenger compartment module.

* * * * *

UNITED STATES PATENT AND TRADEMARK OFFICE
CERTIFICATE OF CORRECTION

PATENT NO : 5,882,064
DATED : March 16, 1999
INVENTOR(S) : Emmons

It is certified that error appears in the above-identified patent and that said Letters Patent are hereby corrected as shown below:

In claim 1, column 9, line 22, replace "midrail" with --primary rail--.

Signed and Sealed this

Sixth Day of March, 2001

Attest:

NICHOLAS P. GODICI

Attesting Officer      Acting Director of the United States Patent and Trademark Office